United States Patent [19]

Pfeil et al.

[11] Patent Number: 5,459,180
[45] Date of Patent: Oct. 17, 1995

[54] POLYOL/EPOXY ADDUCTS FOR USE AS EMULSIFIER FOR LIQUID EPOXY RESINS

[75] Inventors: Armin Pfeil, Wiesbaden; Joerg-Peter Geisler, Ingelheim; Claus Godau, Kiedrich; Bernhard Stengel-Rutkowski, Wiesbaden; Matthias Meyer, Hamburg; Stefan Petri, Taunusstein, all of Germany

[73] Assignee: Hoechst AG, Germany

[21] Appl. No.: 320,964

[22] Filed: Oct. 12, 1994

Related U.S. Application Data

[62] Division of Ser. No. 218,765, Mar. 28, 1994, abandoned.

[30] Foreign Application Priority Data

Mar. 29, 1993 [DE] Germany .......................... 43 10 198.4

[51] Int. Cl.$^6$ .......................... C08G 59/04; C08L 63/00
[52] U.S. Cl. .......................... 523/403; 523/404; 525/524; 528/103
[58] Field of Search .......................... 528/103; 523/403, 523/404; 525/524

[56] References Cited

U.S. PATENT DOCUMENTS

| 3,352,804 | 11/1967 | Harrison et al. | 260/18 |
| 4,197,389 | 4/1980 | Becker et al. | 528/103 |
| 4,415,682 | 11/1983 | Becker | 523/403 |
| 4,886,845 | 12/1989 | Becker et al. | 523/403 |
| 5,236,974 | 8/1993 | Dreischhoff et al. | 523/403 |
| 5,362,835 | 11/1994 | Rolfe et al. | 528/87 |

FOREIGN PATENT DOCUMENTS

| 0000605 | 2/1979 | European Pat. Off. . |
| 0272595 | 6/1988 | European Pat. Off. . |
| 0493916 | 7/1992 | European Pat. Off. . |
| 2115424 | 9/1983 | United Kingdom . |

*Primary Examiner*—Frederick Krass
*Attorney, Agent, or Firm*—Bierman and Muserlian

[57] ABSTRACT

Polyol/epoxy adducts obtained by reaction of
(A) an aliphatic polyol having an average molecular weight (Mw) of 200 to 2000 and
(B) an epoxy compound having at least two epoxy groups per molecule and an epoxy equivalent weight of 100 to 2000,
the equivalent ratio of the OH groups to the epoxy groups being 1:3.51 to 1:10, preferably 1:4 to 1:9, particularly preferably 1:45 to 1:8, and the epoxy equivalent weight of the adduct being between 150 g/eq and at least 800 g/eq, preferably between 250 g/eq and 1000 g/eq which adducts serve as nonionic emulsifiers in water-dilutable epoxy liquid resins.

6 Claims, No Drawings

POLYOL/EPOXY ADDUCTS FOR USE AS EMULSIFIER FOR LIQUID EPOXY RESINS

This is a Division of Ser. No. 218,765 filed Mar. 28, 1994, now abandoned.

Among the cold-curing waterborne paints, water-dilutable epoxy resin systems have increasingly gained in importance. These two-component systems exhibit excellent properties compared with one-component water-borne paints. The following positive properties may be pointed out: no or only a small solvent content, nonflammability, no or only a slight odor nuisance, easy processibility, little sensitivity to moist surfaces, good drying and rapid curing, excellent adhesion to most substrates, very good adhesion as intermediate layer, good resistance to corrosion on metals and easy cleaning of the working equipment directly after use.

In general, liquid epoxy resins which possibly contain emulsifiers, resins diluted with reactive thinners and solid resin dispersions are suitable as binders for water-dilutable epoxy systems. In the case of liquid resins, it is common to use mixtures of epoxy resins based on bisphenol A and F (A/F resins) in order to lower the susceptibility to crystallization. If the liquid resin is to be self-emulsifying, it is necessary to use a nonionic emulsifier (hydrophilic lipophilic balance HLB> 16) in order to transfer the strongly hydrophobic epoxy resin (HLB<1) to the aqueous continuous phase. This effect can in part also be produced by water-dilutable curing agents which themselves have emulsifying properties. Unmodified A/F resin mixtures are not self-emulsifying and are only water-dilutable in combination with aqueous curing agents such as described, for example, in EP 0, 000, 605; such systems often provide very good resistance to corrosion. Externally emulsified systems are well known in the prior art (DE 2, 726, 269, EP 491, 550, DE 4, 137, 590). Thus, for example, A/F liquid resins diluted by reactive thinner are used in combination with nonionic emulsifiers. Although these externally emulsified resins overall exhibit good properties, the hydrophilic emulsifier content of the resulting coatings leads to a poorer resistance to corrosion compared with the above-mentioned systems.

Accordingly, the aim of the present invention was to develop an emulsifier for formulating water-dilutable epoxy liquid resins resulting in a self-emulsifying, water-free liquid resin having improved resistance to corrosion and an altogether improved property profile.

For epoxy resins, specific emulsifiers obtained by condensation of diglycidyl compounds with polyoxyalkylenediols are known. These systems have been found to be useful, for example, in the preparation of aqueous epoxy solid resin dispersions. Thus, U.S. Pat. No. 4,122,067 describes an emulsifier system obtained by condensation of diglycidyl ethers with polyethylene glycols in the molar ratio of OH group to epoxy group of 1:0.5 to 1:0.833. Accordingly, this patent exclusively covers OH-functional emulsifiers. EP 0, 272, 595 discloses a comparable emulsifier system (OH/EP of 1:0.85 to 1:3.5), in which the use of specific catalysts in the condensation reaction also plays an important role. This patent describes not only OH-functional but also EP-functional systems.

EP 0, 000, 605 describes analogous systems which have an OH/EP ratio of between 1:1.333 and 1:4 but are used here for hydrophilizing modified polyamines in order to obtain water-dilutable epoxy curing agents.

Surprisingly, it has now been found that suitable compounds having increased epoxy content, i.e., having a higher epoxy functionality, are highly suitable for use as nonionic emulsifier in water-dilutable epoxy liquid resin systems.

Accordingly, the present invention relates to polyol/epoxy adducts obtained from:

(A) an aliphatic polyol having an average molecular weight (Mw) of 200 to 20000 and (B) an epoxy compound having at least two epoxy groups per molecule and an epoxy equivalent weight of 100 to 2000, the equivalent ratio of OH groups to EP groups being 1:3.51 to 1:10, preferably 1:4 to 1:9, particularly preferably 1:4.5 to 1:8, and the epoxy equivalent weight of the adduct being between 150 g/eq and at least 8000 g/eq, preferably between 250 g/eq and 1000 g/eq.

The aliphatic polyols (A) are preferably polyether polyols (polyalkylene glycols) having average molecular weights (Mw; gel permeation chromatography; polystyrene standard) of, preferably, between 200 and 20000, in particular 1000 to 6000, and OH numbers of, advantageously, 10 to 600, preferably 15 to 120. Preferably, these polyether polyols contain only terminal, primary OH groups. Examples of these include block copolymers of ethylene oxide and propylene oxide and polyethylene glycols, polypropylene glycols and polybutylene glycols, it also being possible to use mixtures of the particular polyalkylene glycols. Preferably, polyethylene glycols are used.

The epoxy compounds according to (B) preferably have an epoxy equivalent weight of 100 to 2000, in particular 150 to 1000, g/eq. They are polyepoxides having on average at least two epoxy groups per molecule. These epoxy compounds can either be saturated or unsaturated and aliphatic, cycloaliphatic, aromatic and/or heterocyclic and also contain hydroxyl groups. Furthermore, they can contain those substituents and/or functional groups which under the mixing or reaction conditions do not cause any troublesome side reactions, for example alkyl or aryl substituents, ether groupings and the like.

Preferably, these epoxy compounds are polyglycidyl ethers based on polyhydric, preferably dihydric, alcohols, phenols, hydrogenation products of these phenols and/or of novolaks (reaction products of mono- or polyhydric phenols with aldehydes, in particular formaldehyde in the presence of acid catalysts). The epoxy equivalent weights of these epoxy compounds are preferably between 100 and 2000, in particular between 100 and 350.

Examples of polyhydric phenols include: resorcinol, hydroquinone, 2,2-bis(4'-hydroxyphenyl)propane (bisphenol A), mixtures of isomers of dihydroxydiphenylmethane (bisphenol F), tetrabromobisphenol A, 4,4'-dihydroxydiphenylcyclohexane,4,4'-dihydroxy- 3,3'-dimethyldiphenyl propane,4,4'-dihydroxydiphenyl,4,4'-dihydroxybenzophenone, 1,1-bis(4'-hydroxyphenyl)ethane, 2,2-bis[4'-(2"-hydroxypropoxy)phenyl]propane, 1,1-bis(4'-hydroxyphenyl)isobutane, 2,2-bis(4'-hydroxy-3'-tert.-butylphenyl)propane,bis(2-hydroxynaphthyl)methane, 1,5-dihydroxynapthalene, tris4-hydroxyphenyl)methane, bis(4-hydroxyphenyl) ether, bis(4-hydroxyphenyl) sulfone and the like, and the halogenation and hydrogenation products of the abovementioned compounds. Of these, bisphenol A is particularly preferred.

Examples of polyhydric alcohols as basis for the corresponding polyglycidyl ethers are ethylene glycol, diethylene glycol, triethylene glycol, polyethylene glycols (n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentylglycol, trimethylolethane and trimethylolpropane. Of these, polypropylene glycols (n=8–10) are particularly preferred.

It is also possible to use polyglycidyl esters of polycarboxylic acids obtained by reaction of epichlorohydrin or similar epoxy compounds with an aliphatic, cycloaliphatic or aromatic polycarboxylic acid, such as oxalic acid, succinic acid, adipic acid, glutaric acid, phthalic acid, terphthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

A detailed list of suitable epoxy compounds can be found in the handbook "Epoxidverbindungen und Epoxidharze" by A.M. Paquin, Springer Verlag, Berlin 1958, Chapter IV and in Lee, Neville, "Handbook of Epoxy Resins", McGraw-Hill Book Co., 1967, Chapter 2. The epoxy compounds mentioned can be used individually or in a mixture.

Preferably, the emulsifier is prepared by condensation of the polyether polyols (A) mentioned with the epoxy compounds (B) in the presence of suitable catalysts, at 50° to 200° C., preferably at 90° to 170° C., the equivalent ratio of the OH groups to the epoxy groups being 1:3.51 to 1:10, preferably 1:4 to 1:9, particularly preferably 1:4.5 to 1:8, and the epoxy equivalent weight of the condensation product being 150 g/eq to at least 8000 g/eq, preferably 250 g/eq to 1000 g/eq.

Suitable catalysts for preparing the dispersing agent are strong inorganic and organic bases, such as, for example, sodium hydroxide, potassium hydroxide, lithium hydroxide, barium hydroxide, strontium hydroxide, alkali metal alcholates, such as sodium methoxide, lithium methoxide, sodium ethoxide and potassium dodecyloxide, and the alkali metal salts of carboxylic acids, such as, for example, sodium stearate and lithium stearate. Strong inorganic and organic protic acids, for example phosphoric acid, tetrafluoroboric acid and benzenesulfonic acid, are also suitable. Furthermore, the catalysts used can be Lewis acids. Examples include tin(IV) chloride, titanium(IV) chloride, titanium(IV) isopropoxide, triethyloxonium tetrafluoroborate and boron trifluoride and its complexes, for example with phosphoric acid, acetic acid (1:1 and 1:2), methanol, diethyl ether, tetrahydrofuran, phenol, ethylene glycol monoethyl ether, polyethylene glycol (MW200), dimethyl sulfoxide, di-n-butyl ether, di-n-hexyl ether, succinic acid, and aliphatic, cycloaliphatic, araliphatic amines and nitrogen heterocycles.

Catalysts which are preferably used are $BF_3$-diethyl ether, $BF_3$-amine complexes and aqueous tetrafluoroboric acid. The amount of catalyst is in general 0.1 to 5, preferably 0.1 to 1% by weight, relative to the reaction mixture. For improved metering, the catalyst can be diluted in a solvent, such as diethyl ether, a glycol ether or cyclic ether, ketones, and the like.

To prepare the emulsifier, the mixtures of hydroxyl- and epoxy-containing compounds to be reacted are heated to the temperature at which condensation proceeds at a sufficient rate, i.e., within 30 minutes to 5 hours. Advantageously, the reaction is monitored by the increase of the epoxy equivalent, which indicates a decrease in the epoxy group content. The reaction can be stopped by cooling below the reaction temperature.

Mixing of the emulsifiers thus obtained with epoxy liquid resins gives self-emulsifying liquid resin systems which in combination with the customary, preferably water-dilutable or water-emulsifiable, amine curing agents having good properties. This mixing advantageously takes place at elevated temperature, if desired under vacuum, in order to prevent foaming.

Especially resins based on bisphenol A and bisphenol F diglycidyl ethers (BADGE and BFDGE) have proven to be suitable as epoxy liquid resin components. The use of small amounts of BFDGE increases the resistance to chemicals and lowers the tendency to crystallization, but adversely affects the resistance to chalking and tendency to yellowing. The addition of up to 20% of reactive thinners may be appropriate for exerting a favorable effect on viscosity and pot life.

Examples of curing agents, preferably for curing at room temperature and/or lower temperatures (amine cold-curing agents), which are in general used in equivalent ratio of epoxy equivalent to amine hydrogen equivalent of 1:0.75 to 1:2.0, are polyalkyleneamines, such as diethylenetriamine, triethylenetetramine, tetraethylenepentamine, pentaethylenehexamine, and the like, further 2,2,4-and/or 2,4,4-trimethylhexamethylenediamine,bis(3-aminopropyl)amine, 1,4-bis(3'-aminopropyl)piperazine, N,N-bis(3-aminopropyl)ethylenediamine, neopentanediamine, 2-methyl-1,5-pentanediamine, 1,3-diaminopentane, hexamethylenediamine and the like, and cycloaliphatic amines, such as 1,2- or 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine and reaction products thereof, 4,4'-diaminodicyclohexylmethane and -propane, bis(4-aminocyclohexyl)methane and -propane, 3,3'-dimethyl-4,4'-diaminodicyclohexylmethane, 3-amino-1-cyclohexylaminopropane, 1,3- and 1,4-bis(aminomethyl)cyclohexane. The araliphatic amines used are in particular those in which aliphatic amino groups are present, for example meta- and para-xylylenediamine or hydrogenation products thereof. The amines mentioned can be used on their own or as mixtures.

Amine curing agents which are preferably used are, in addition to the abovementioned polyamines, water-soluble polyoxyalkylenedi- and -polyamines having molecular weights of 100 to 2000, for example the products sold by Texaco under the tradename Jeffamines, and the easily water-dispersible curing agents such as described in German Auslegeschrift 2, 332, 177 and EP Patent Specification 0, 000, 605, i.e., for example, modified amine adducts.

Mannich bases, epoxy-amine adducts or polyamidoamines can also be used as the curing agents.

Suitable Mannich bases are prepared by condensation of polyamines, preferably diethylenetriamine, triethylenetetramine, isophoronediamine, 2,2,4- or 2,4,4-trimethylhexamethylenediamine, 1,3- and 1,4-bis(aminomethyl)cyclohexane, in particular meta- and para-xylylenediamine, with aldehydes, preferably formaldehyde and mono- or polyhydric phenols having at least one ring position which is reactive with aldehydes, for example the various creosols and xylenols, para-tert.-butylphenol, resorcinol, 4,4,-dihydroxydiphenylmethane, 2,2-bis(4'-hydroxyphenyl)propane, but preferably phenol.

Examples of suitable amine/epoxy adducts are reaction products of polyamines, such as, for example, ethylenediamine, propylenediamine, hexamethylenediamine, 2,2,4-and 2,4,4-trimethylhexamethylenediamine, meta-xylylenediamine and/or bis(aminomethyl)cyclohexane, with terminal mono- or polyepoxides such as, for example, propylene oxide, hexene oxide, cyclohexene oxide, or with glycidyl ethers, such as phenyl glycidyl ether, tert.-butyl glycidyl ether, ethylhexyl glycidyl ether, butyl glycidyl ether or with glycidyl esters, such as the glycidyl ester of versatic acid (Cardura®E) sold by Shell or the polyglycidyl ethers and polyglycidyl esters mentioned under (B). Polyamidoamines which can be used for curing the epoxy resin dispersions according to the invention are obtained, for example, by reaction of polyamines with mono- or polycarboxylic acids, for example dimerized fatty acids.

In order to achieve more rapid and/or more complete curing, the coatings obtainable from the epoxy resin dispersions according to the invention in combination with the amine curing agents mentioned can also be heated at 50° to 120° C. for 15 to 120 minutes.

The self-emulsifiable liquid resin systems according to the invention are used in particular as a protective coating for mineral substrates, i.e., on plaster, concrete, brickwork, cement. They are used for coating, for exam-pie, walls, ceilings and floorings in garages, canteen kitchens, hospitals, dairies, swimming baths, tunnels and nuclear power plants. If suitably formulated, the systems according to the invention can also be used as corrosion-resistant primers on steel. They can also be used as high-gloss clear varnishes for a wide range of substrates, such as, for example, wood.

If desired, the customary pigments and fillers known to one skilled in the art can be added, either to the liquid resin component and/or to the curing agent component.

The examples which follow are intended to be representative of the invention without, by virtue of their selection, limiting it:

EXAMPLES

The following abbreviations are in use:

| BADGE | diglycidyl ether of bisphenol A |
|---|---|
| BFDGE | diglycidyl ether of bisphenol F |
| PEG nnnn | polyethylene glycol of average molecular weight nnnn g/eq |
| EEW | epoxy equivalent weight |

I. Emulsifiers

I.1 BADGE+PEG 2000 (OH/EP=1:6.6)

389 g of 100% diglycidyl ether of bisphenol A having an EEW of 185 g/eq (BADGE, Beckopox® EP 140 from Hoechst) are heated together with 311 g of polyethylene glycol (PEG) having an average molecular weight of 2000 g/eq to 25° C. in a nitrogen atmosphere. 1.5 g of a BF3-amine complex are added as the catalyst (Anchor 1040 from Anchor) with thorough stirring. The temperature is steadily increased to 150° C. over a period of four hours. The EEW is now 415–420 g/eq. The batch solidifies at room temperature to give a waxlike crystalline material.

1.2 BADGE/BFDGE+PEG 1000 (OH/EP=1:4.4)

480 g of a mixture of 35% of BFDGE and 65% of BADGE having an average EEW of about 180 g/eq are heated together with 300 g of PEG having an average molecular weight of 1000 g/eq, to 125° C. in a nitrogen atmosphere. 1.4 g of Anchor 1040 are added with thorough stirring. The temperature is steadily increased to 160° C. (5K/30 min); after 3.5 hours, an EEW of 360 g/eq is reached. By the addition of a total of 0.35 g of Anchor 1040 in two portions at this temperature, an EEW of 400 g/eq is reached after another three hours. The batch solidifies at room temperature to give a waxlike crystalline material.

I.3 BFDGE+PEG 1000 (OH/EP=1:4.7)

480 g of BFDGE (Beckopox® SEP 106; EEW 170 g/eq) are heated together with 300 g of PEG 1000° to 125° C. in a nitrogen atmosphere. 1.7 g of Anchor 1040 are added with thorough stirring. The temperature is steadily increased to 160° C. (5K/30 min); an EEW of 350 g/eq is reached after four hours. The batch solidifies at room temperature to give a wax-like crystalline material.

I.4 BADGE+PEG 1000 (OH/EP=1:4.4)

96 g of BADGE (Beckopox® EP 140; EEW 185 g/eq) are heated together with 310 g of PEG 1000° to 125° C. in a nitrogen atmosphere. 2.0 g of Anchor 1040 are added with thorough stirring. The temperature is steadily increased to 160° C. (5K/30 min); an EEW of 420 g/eq is reached after two hours. The batch thickens at room temperature to give a light-colored liquid having a viscosity of 25 Pas (25° C.).

I.A BADGE+PEG 1000 (OH/EP=1:1.2) Comparative example according to EP 0, 272, 595

110 g of BADGE (Beckopox® EP 140; EEW 185 g/eq) are heated together with 1000 g of PEG 4000° to 80° C. in a nitrogen atmosphere. 2.0 g of HBF$_4$ are added with thorough stirring. The temperature is steadily increased to 120° C. (5K/30 min) and maintained at this temperature until the EEW is more than 20000 g/eq. The batch solidifies at room temperature to give a light-colored waxlike material.

I.B BADGE+PEG 2000 (OH/EP=1:2.3) Comparative example according to EP 0, 272, 595

154 g of BADGE having an epoxy equivalent weight (EEW) of 185 g/eq (Beckopox® EP 140) are heated together with 346 g of PEG having an average molecular weight of 2000 g/eq to 125° C. in a nitrogen atmosphere. 1.1 g of a BF$_3$-amine complex are added as the catalyst (Anchor 1040 from Anchor) with thorough stirring. The temperature is steadily increased to 160° C.; an EEW of 600 g/eq is reached after 5.5 hours. By further addition of a total of 2.0 g of Anchor 1040 in four portions at this temperature, an EEW of 1000 g/eq is obtained after another 10 hours. The dark-colored batch solidifies at room temperature to give a waxlike crystalline material.

II Liquid resin mixtures

II.1 Emulsifier I. 1 and BFDGE/BADGE resin 175 g of diglycidyl ether of bisphenol F having an EEW of 165–175 (BFDGE, Beckopox® SEP 106) and 325 g of BADGE (Beckopox® EP 140) are homogenized at room temperature. 68.2 g of the emulsifier obtained according to Example I. 1, (12%, relative to the total weight) are added to the homogeneous mixture. The mixture is homogenized at 70° C. for two hours under nitrogen. The self-emulsifiable liquid resin mixture thus obtained has an EEW of 190–200 g/eq and a viscosity of 4800 mPas (25° C.).

II.2 Emulsifier 1.2 and BFDGE/BADGE resin

The procedure of Example II.1 is repeated. The self-emulsifiable liquid resin mixture thus obtained has an EEW of 190–200 g/eq and a viscosity of 7800 mPas (25° C.).

II.3 Emulsifier 1.3 and BFDGE/BADGE resin

The procedure of Example II.1 is repeated. The self-emulsifiable liquid resin mixture thus obtained has an EEW of 190–200 g/eq and a viscosity of 6900 mPas (25° C.).

II.4 Emulsifier I. 4 and BFDGE/BADGE resin

The procedure of Example II.1 is repeated. The self-emulsifiable liquid resin mixture thus obtained has an EEW of 195 g/eq and a viscosity of 12700 mPas (25° C.).

II.5 Emulsifier 1.4 and BADGE resin

The procedure of Example II.1 is repeated. The self-emulsifiable liquid resin mixture thus obtained has an EEW of 200 g/eq and a viscosity of 10000 mPas (25° C.).

II.A Emulsifier I.A and BFDGE/BADGE resin (Emulsifier from EP 0272, 595)

The procedure of Example II.1 is repeated. The self-emulsifiable liquid resin mixture thus obtained has an EEW of 210 g/eq and a viscosity of 20000 mPas (25° C.).

II.B Emulsifier I.B and BFDGE/BADGE resin

The procedure of Example II. 1 is repeated. The self-emulsifiable liquid resin mixture thus obtained has an EEW of 190–200 g/eq and a viscosity of 7000 mPas (25° C.).

II.C Mixture of commercially available emulsifiers and BFDGE/BADGE resin Example 22 of EP 0, 000, 605 parative examples. The good property profile is rounded off by good flow properties and film formation without exception, in combination with, in some cases, significantly increased hardness. Owing to the absence of reactive thinners, the products according to the invention are much less problematical in terms of industrial hygiene.

The test results are summarized in the following table:

| | III.2 Results of the application test | | | | | | |
|---|---|---|---|---|---|---|---|
| | Emulsifiers according to the invention | | | | | Comparative examples | |
| Liquid resin | II.2 | II.3 | II.4 | II.5 | II.A | II.B | II.C |
| Amount of curing agent | 33.3 g | 33.3 g | 25.0 g | 33.3 g | 33.3 g | 33.3 g | 50.0 g |
| Amount of 40% curing agent | 50.8 g | 50.8 g | 37.5 g | 47.6 g | 46.6 g | 49.0 g | 75.4 g |
| Amount of water | 33.3 g | 33.3 g | 14.3 g | 33.3 g | 33.3 g | 33.3 g | 50.0 g |
| Pot life | 1 h 50 | 2 h | 1 h 40 | 2 h | 2 h, solid | 2 h | 3 h |
| Drying dust-dry | 35 min | 30 min | 45 min | 45 min | 55 min | 50 min | 3 h 30 |
| Drying non-tacky | 8 ... 24 h | 8 ... 24 h | 7 h | 8 ... 24 h | 8 ... 24 h | 8 ... 24 h | 8 ... 24 h |
| Flow properties | 0 | 0 | 0 | 0–1 | 0 | 0 | 1–2 |
| Film transparency | 0 | 0 | 0 | 0 | 3–4 | 0 | 0 |
| Pendulum hardness after 1 day | 145 | 159 | 152 | 163 | 149 | 128 | 101 |
| Pendulum hardness after 2 days | 174 | 187 | 182 | 191 | 160 | 163 | 132 |
| Pendulum hardness after 7 days | 215 | 221 | 205 | 222 | 197 | 204 | 176 |
| Resistance to water after 24 hours | 0–1 | 0–1 | 0–1 | 0–1 | 5 | 0–1 | 3 |
| Notes | | | | skin formation, non-stirrable | not resistant to water | skin formation stirrable | loss in adhesion when tested for resistance to water |

*Rating: 0 = excellent to 5 = poor 30 g of the diglycidyl ether of bisphenol F having an EEW of 165–175 (BFDGE, Beckopox® SEP 106) and 45.1 g of BADGE (Beckopox® EP 140) are homogenized at room temperature. The mixture having an EEW of about 180 g/eq and a viscosity of about 6500 maPas was mixed in the heat with 4.8 g of an emulsifier mixture composed of 2.14 g of an adduct of 25–30 mol of ethylene oxide with 1 mol of abietic acid, 0.8 g of an adduct of 4 mol of ethylene oxide with 1 mol of p-nonylphenol, 0.8 g of an adduct of 10 mol of ethylene oxide with 1 mol of p-nonylphenol and 1.06 g of n-dodecyl alcohol. The EEW was about 185 g/eq.

III Application test

III.1 Curing agent used, formulation

The curing agent is a water-dilutable adduct of isophoronediamine, meta-xylylenediamine and a modified diglycidyl compound which is present in the form of an 80% solution in water. The viscosity is about 20000 mPas, the calculated amine/hydrogen equivalent weight is 115 g/eq (Beckopox VEH 2133 w). Before use, the curing agent is made into 40 % strength with water. A slight over crosslinking (1.25 per epoxy group) is selected for the formulation of the two-component system, and the entire mixture is brought to the testing viscosity with water.

The liquid resins according to the invention exhibit a somewhat shortened pot life, but have the advantage of a significantly shortened drying time, (dust-dry) and increased initial hardness. The most significant advantage is the good resistance to water which is not obtainable with all com-

What is claimed is:

1. An aqueous dispersion comprising a liquid epoxy resin which is not a polyol-epoxy adduct, containing as emulsifier a polyol-epoxy adduct obtained by reaction of (A) an aliphatic polyol having a weight average molecular weight of 200 to 20,000, and (B) an epoxy compound having at least two epoxy groups per molecule, and an epoxy equivalent weight of 100 to 2000, wherein the ratio of the number of hydroxy groups in (A) to the number of epoxy groups in (B) is from 1:4 to 1:10, and the epoxy equivalent weight of this adduct is between 150 and 8000 g/eq.

2. The aqueous dispersion of claim 1, wherein the ratio of the number of hydroxy groups in (A) to the number of epoxy groups in(B) is from 1:4.5 to 1:9, and the epoxy equivalent weight of this adduct is between 250 and 1000 g/eq.

3. An aqueous dispersion of claim 1 is wherein in the preparation of the emulsifier, the epoxy compound used is a diglycidyl ether of a polyhydric phenol with an epoxy equivalent weight of 100 to 2000.

4. An aqueous dispersion of claim 1 wherein in the preparation of the emulsifier, the epoxy compound used is selected from the group consisting of the diglycidyl ether of bisphenol-A and the diglycidyl ether of bisphenol-F.

5. An aqueous dispersion of claim 1 wherein in the preparation of the emulsifier, the epoxy compound used is a diglycidylether of a polyalkylene glycol with an epoxy equivalent weight of 100 to 2000.

6. An aqueous dispersion of claim 1 wherein in the preparation of the emulsifier, the epoxy compound used is a diglycidyl ether of a polyethylene glycol with an epoxy equivalent weight of 100 to 2000.

* * * * *